UNITED STATES PATENT OFFICE.

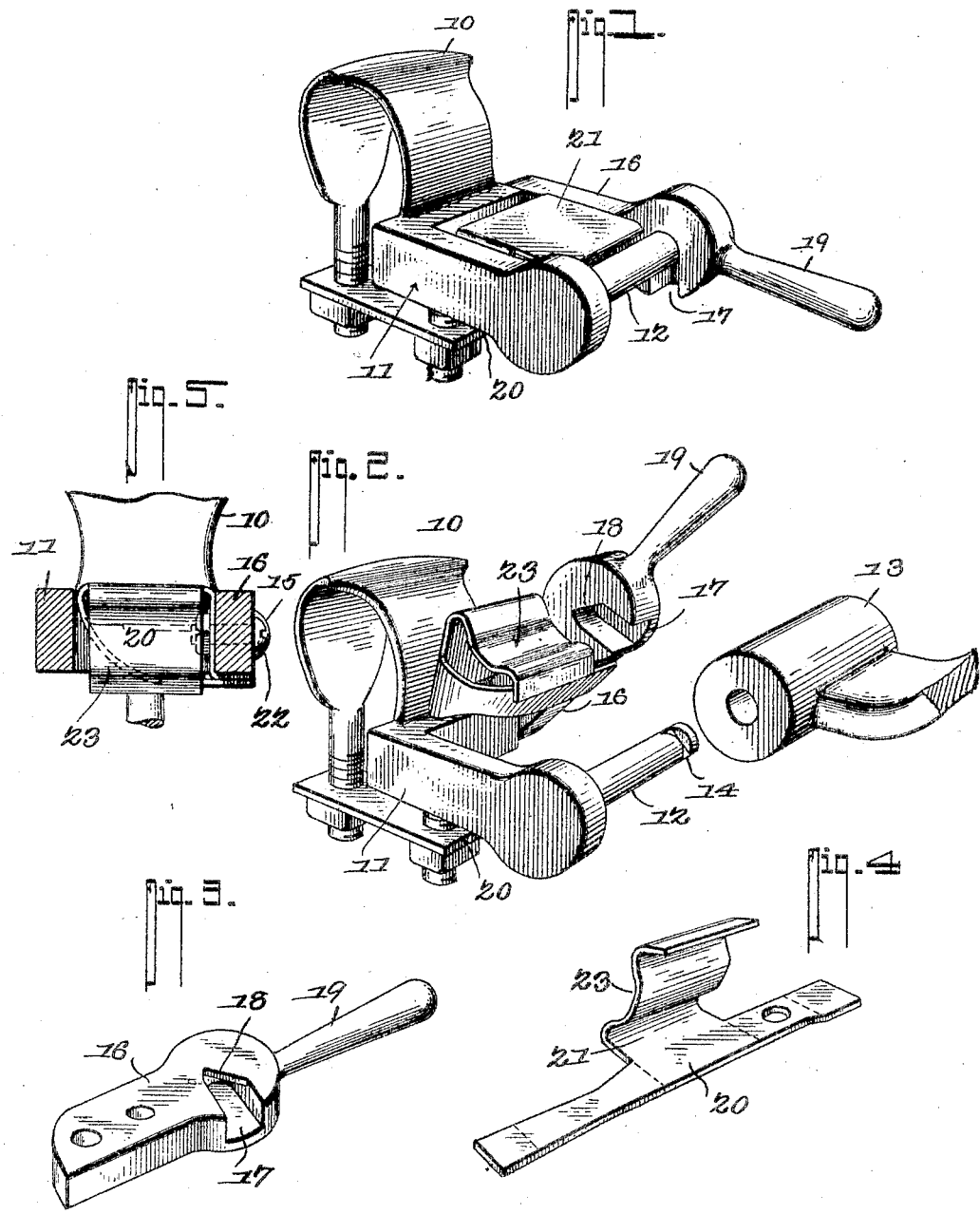

WILLIAM M. JENKINS, OF MAPLELAKE, MINNESOTA.

THILL-COUPLING.

No. 797,119. Specification of Letters Patent. Patented Aug. 15, 1905.

Application filed November 14, 1904. Serial No. 232,702.

*To all whom it may concern:*

Be it known that I, WILLIAM M. JENKINS, a citizen of the United States, residing at Maplelake, in the county of Wright and State of Minnesota, have invented a new and useful Thill-Coupling, of which the following is a specification.

This invention relates to thill-couplings of the class known as "quick shifting," and has for its object to produce a device of this character which will be strong and durable, quickly manipulated, and which will effectually and safely hold the thills or tongue in position and at the same time prevent rattling when in operation.

Another object of the invention is to produce a device of this character wherein the antirattle-spring and holding-spring are combined.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved device in closed position. Fig. 2 is a similar view, together with a portion of thill-iron, with the movable parts in open position. Fig. 3 is a detached perspective view of the swinging arm. Fig. 4 is a perspective view of the combined antirattle and holding spring detached and partially bent into shape to illustrate its construction. Fig. 5 is a transverse section just forward of the holding-spring.

The improved device comprises a clip portion 10 of the usual form for connection to the axle and provided with an arm 11, extending from one side and provided with a stud 12 for engaging the terminal of the thill or tongue iron represented at 13 and disposed parallel to the clip member and spaced therefrom, the stud having a transverse recess 14 near its free end. Pivoted, as at 15, to the side of the clip member opposite to the arm 11 is another arm 16, having a "blind slot" or recess 17 for passing over the free end of the stud 12 and provided with an internal rib 18 for entering the recess 14 in the stud when the swinging arm is in depressed position, as in Fig. 1. The arm 16 is extended into a handle 19 at its free end to assist in operating it. When thus constructed and the thill or tongue member 13 in position upon the stud 12 and the swinging arm closed, as in Fig. 1, it is obvious that the thill or tongue will be firmly held from lateral movement, but free to rotate upon the stud, the rib 18, entering the recess 14, effectually preventing the lateral strains from being communicated to the pivot at 15.

A spring member is disposed between the member 13 and the base portion of the clip 10, consisting of a plate 20, having a lateral wing 21 and bent into shape for bolting, as at 22, to the arm 16, with the wing portion concaved, as at 23, to conform to the surface of the member 13 for bearing against and partially encompassing the same. By this means the spring is caused to perform two important functions: First, by pressing constantly upon the member 13 it serves as an antirattler, and, second, by partially encompassing the member 13 it serves as a yieldable binding means for holding the arm 16 in position and preventing accidental displacement when in use. The wing portion 21 and its concaved portion 23 are so formed that they will offer considerable resistance to the closing of the arm 16, so that it will engage the member 13 with a constant pressure, and thus effectually perform the required function of an antirattler and as a holding means for retaining the arm 16 in position.

The body of the clip member and the stud 12 are preferably integral and formed from malleable iron or steel.

With a vehicle equipped with a pair of the improved devices and with a pair of thills and a tongue provided with the member 13 properly spaced to correspond it is obvious that the vehicle can be very quickly and easily changed from a single to a double rig by simply detaching the arms 16 and drawing the thill or tongue, as the case may be, off from the studs and replacing them by the desired member and then closing the arms again. The operation requires no loosening of bolts or set-screws or the removal of parts or the delay caused by such devices.

The device is compact, strong, and durable and can be adapted to any of the various sizes or forms of vehicles manufactured.

Having thus fully described the invention, what is claimed is—

1. In a thill-coupling, an axle-clip having a stationary arm carrying a thill-engaging stud, a pivoted arm engaging the free end of said thill-engaging stud, and a thill-engaging spring carried by the pivoted arm to retain the latter in stud-engaging position.

2. In a thill-coupling, an axle-clip having a thill-engaging stud and a pivoted arm extended to form a handle and having a stud-engaging recess, in combination with a spring carried by said arm and having a curved portion adapted to engage the thill-eye to keep the latter from rattling and to retain the pivoted arm in stud-engaging position.

3. An axle-clip having a stationary arm and a pivoted arm, a notched stud carried by the stationary arm, stud-engaging means carried by the pivoted arm, and a curved spring resiliently supported by the pivoted arm and adapted to bear upon a thill-eye engaging the stud to prevent rattling and to lock the pivoted arm against movement.

4. A thill-coupling, a thill-engaging stud supported at one end, a pivotally-supported member having means for engaging the free end of said stud, and a spring supported by and movable with the pivoted member and having an integral curved portion adapted to engage a thill-eye supported upon the stud.

In testimony that I claim the foregoing as my own I have hereto affixed my signature in the presence of two witnesses.

WILLIAM M. JENKINS.

Witnesses:
A. W. NARY,
C. W. NARY.